United States Patent [19]

Mechtersheimer

[11] Patent Number: 5,009,858
[45] Date of Patent: Apr. 23, 1991

[54] DEVICE FOR GENERATING OZONE

[75] Inventor: Günter Mechtersheimer, Nussbaumen, Switzerland

[73] Assignee: Asea Brown Boveri Limited, Baden, Switzerland

[21] Appl. No.: 487,439

[22] Filed: Mar. 2, 1990

[30] Foreign Application Priority Data

Mar. 7, 1989 [CH] Switzerland .............. 845/89

[51] Int. Cl.$^5$ ............................................. B01J 19/08
[52] U.S. Cl. ............... 422/186.19; 422/186.07; 422/186.18; 422/186.21; 422/907
[58] Field of Search ............ 422/186.07, 186.18, 422/186.19, 186.21, 907

[56] References Cited

U.S. PATENT DOCUMENTS

| 2,811,217 | 10/1957 | Steitz | 183/2.5 |
| 3,836,786 | 9/1974 | Lowther | 250/540 |
| 4,654,199 | 3/1987 | Gloor et al. | 422/186.19 |
| 4,690,803 | 9/1987 | Hirth | 422/186.18 |
| 4,770,858 | 9/1988 | Collins | 422/186.18 |

FOREIGN PATENT DOCUMENTS

| 0165424 | 12/1985 | European Pat. Off. . |
| 2436914 | 2/1975 | Fed. Rep. of Germany . |
| 2357392 | 5/1975 | Fed. Rep. of Germany . |
| 3422989 | 12/1985 | Fed. Rep. of Germany . |

Primary Examiner—Stephen J. Lechert, Jr.
Assistant Examiner—N. Bhat
Attorney, Agent, or Firm—Oblon, Spivak, McClelland, Maier & Neustadt

[57] ABSTRACT

In an ozone generator of modular design, glass tubes (3) are installed, tightly packed, in a housing (2) and cast therein by a casting compound (4) of good thermal and/or electric conductivity. Double helixes (5) of steel wire are placed in the glass tubes. Only the spaces between the tube inside wall and the steel wires act as discharge spaces (6).

9 Claims, 2 Drawing Sheets

DEVICE FOR GENERATING OZONE

BACKGROUND OF THE INVENTION

1. Field of the Invention

The invention relates to a device for generating ozone from oxygen or gas containing oxygen by silent electric discharge in a discharge space through which the gas flows and which is essentially formed by an outer tube of dielectric material and an internal electrode, arranged inside the said tube, and an external electrode, surrounding the outer tube.

With this preamble, the invention makes reference to a prior art such as arises for example from German Offenlegungsschrift 3,422,989 or Swiss Patent Application 3383/88-8 of Sept. 9, 1988 by the applicant.

2. Discussion of Background

The increasing use of ozone for chemical and physical purposes has resulted in the ozone tube developed by Siemens having been decisively improved recently in technical and commercial respects. For instance, it is proposed in U.S. Pat. No. 2,811,217 to increase the ozone yield by certain characteristic variables of the ozonizer (frequency of the feed voltage, dielectric constant of the dielectric material, amplitude of the feed voltage, thickness of the dielectric layer and size of the discharge gap) having to satisfy certain laws.

In other publications, special cooling measures are proposed for the same purpose, in order to increase the ozone yield, for example, apart from the liquid cooling of the external electrode, the internal cooling of the high-voltage electrode with gas or liquid in German Offenlegungsschrift 2,357,392, or the intermediate cooling of the charge gas enriched with ozone in the case of ozonizers arranged in series in German Offenlegungsschrift 2,436,914.

The state of the art today are discharge gap widths around 1 mm. A further reduction in the gap widths is confronted by the geometrical tolerances of the metal and dielectric tubes used. In particular in the case of relatively large tube lengths, a further reduction in the gap widths is limited by the ever-present flexures of the dielectric and metal tubes.

For the purpose of increasing and making more uniform the intensities of the field strengths, it is proposed in German Offenlegungsschrift 3,422,989 to design the internal electrode as a solid metallic rod. Due to its small diameter in comparison with a tube, the field strength at its surface is great. Since the diameter of the external electrode, designed as a metal tube, is correspondingly reduced and thin material thicknesses are used, a flexible structure is obtained. The distance between external and internal electrode and dielectric can be maintained very accurately over the entire length. As a result, a uniform intensity of the field strength, good cooling possibilities, compact design and high output are obtained.

However, this known ozonizer is comparatively complex.

In the Swiss Patent Application cited at the beginning, on the other hand, a completely different approach is presented: a homogenous discharge gap is dispensed with entirely, instead taking care to ensure that the heat generated by the (inhomogenous) discharges is dissipated in as direct a way as possible. For this purpose, thin glass tubes provided with internal electrodes are packed tightly between two cooled metallic plates and a discharge struck externally between the glass tubes and the metallic plates. In some embodiments, a discharge is additionally struck inside the glass tubes.

SUMMARY OF THE INVENTION

Accordingly, on the basis of the prior art, one object of the invention is to provide a novel ozone generator which is distinguished by a compact design, high efficiency and high ozone concentration.

To achieve this object in the case of an ozone generator of the generic type mentioned at the beginning, according to the invention it is envisaged that the tubes of dielectric material are combined in a cluster and arranged in a housing, that the external electrode is formed by a metallization of all the outer surfaces of the tubes and/or by an electrically conductive material surrounding the tubes, that a metallic electrode of a cross-section substantially smaller than the tube cross-section is arranged in each tube as internal electrode and that all of the internal electrodes are connected at least at one tube end electrically to one another.

Thus, differently than in the case of the ozone generator according to the Swiss Patent Application mentioned at the beginning, only the discharge within the tubes is used in the invention. According to the applicant's latest findings, high ozone concentrations can also be achieved with good efficiency in this way. The clustered tubes are tightly packed and, according to the first alternative, (externally) with a good electrically and thermally conductive material (for example easily liquefiable metal or metal powder-filled casting resin). The outside of the tubes is in this case to be at ground potential. According to the other alternative, tubes metallically coated on the outside are used. In this case, the casting resin does not necessarily have to be electrically conductive. A combination of externally metallized tubes with thermally and electrically conductive casting material is also possible. It is also possible to dispense with the casting and to cool the (metallically-coated) tubes with cooling gas.

In view of the greater stability and associated considerably smaller risk of breakage of the comparatively thin dielectric tubes, direct water cooling is also possible. The water virtually replaces the casting compound. In this case, the volume through which water flows is to be sealed from the inlet and outlet openings of the gas stream, for example by casting. If of adequate conductivity, the water itself can provide contacting on the ground side, otherwise the tubes have to be metallized on the outside.

The invention permits a modular design of ozone generators. Each module can be assigned an own cooling device in the form of cooling coils or channels through which coolant flows, in a cluster and/or between the cluster and the housing surrounding the cluster. The geometry and dimensions of the clusters can be adapted to the respective requirements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
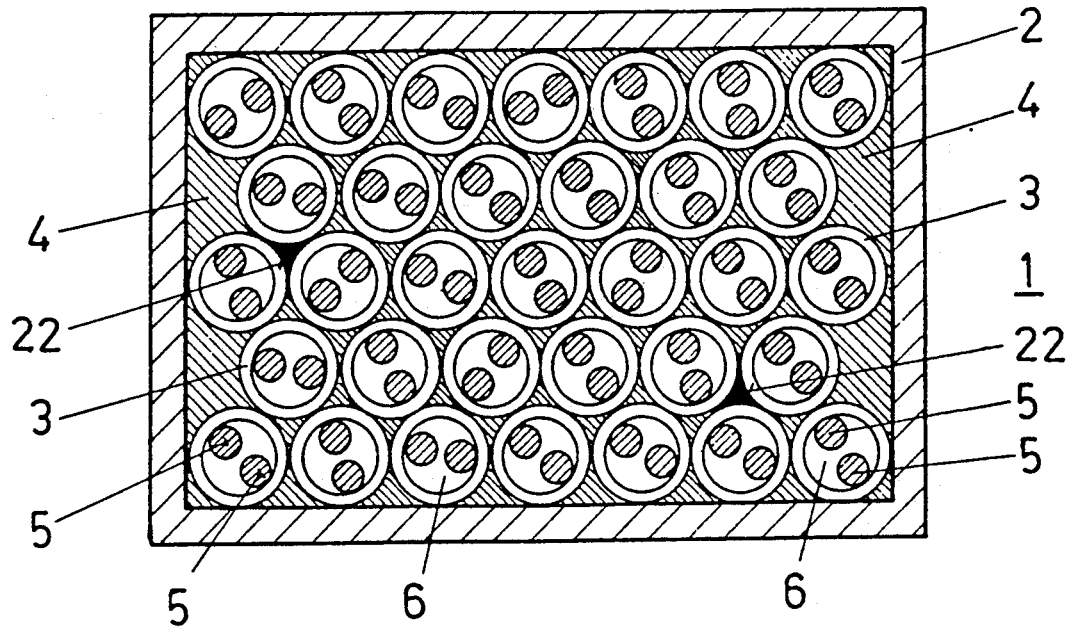
FIG. 1 shows a cross-section through an ozone generator module with dielectric tubes cast in casting compound.

Referring now to the drawings, wherein like reference numerals designate identical or corresponding parts throughout the several views, in FIG. 1 an ozone generator module 1 comprises a metallic housing 2, for example of aluminum sectional material, of rectangular cross-section. A multiplicity of thin-walled glass, ceramic or quartz tubes 3 are placed, tightly packed, into the inner space. The intermediate spaces between the tubes 3 and between the latter and the metallic housing wall are filled with a material 4 which is as thermally conductive as possible. A particularly suitable casting material is an easily liquefiable metal with a low melting point, for example tin, or a metal powder-filled casting resin, for example epoxy resin. In this way, the tubes 3 are coupled both thermally and electrically to the housing 12. The housing 2 forms the electrode at ground potential (external electrode) of the ozone generator. If metal or electrically conductive casting material is used, it is also possible to dispense with a housing 2. Metal rods or metal wires 5, which form the internal electrode(s) of the ozone generator, are placed inside the tubes 3. Apart from twisted-together metal rods of flat or lenticular cross-section, wavy wires or double helixes of steel wire are particularly suitable. The cross-section of the rod or of the wires is in this case distinctly smaller than the cross-section of the tubes 3. The space between the internal electrodes 5 and the inner wall of the tubes 3 forms the discharge space 6, through which oxygen or a gas containing oxygen is passed. Due to the twisting or spiralling, the gas stream flowing through the tubes is swirled well, which has a favorable influence on the ozone yield.

Figure 2:
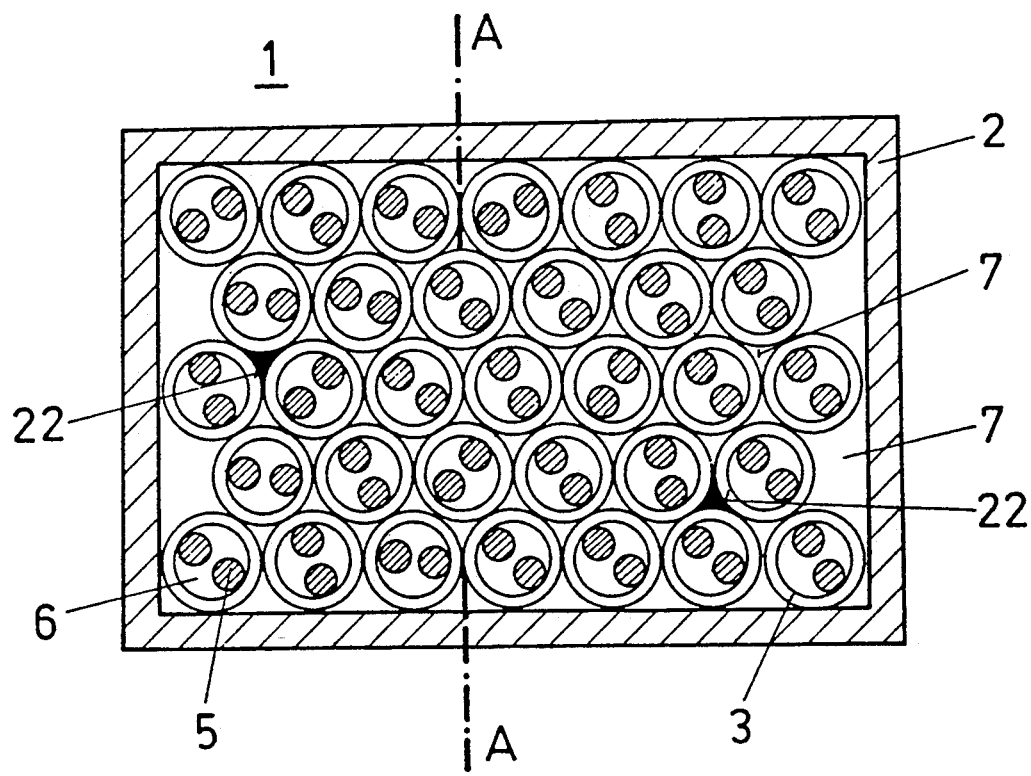
FIG. 2 shows a cross-section through an ozone generator module with water-cooled dielectric tubes.

The ozone generator module according to FIG. 2 differs from that represented in FIG. 1 essentially only by the coupling of the outer surfaces of the tubes 3 to the housing 1. Here, the tubes 3 are metallized, for example coated with aluminum, on the outside. The electrically conductive connection of the inner tubes 3 takes place in this case via the tubes further to the outside. Alternatively, current feeding can take place via local auxiliary contacts 22. The electric coupling of the tubes 3 among one another takes place in this case via their metallic coating. Cooling takes place on the one hand by thermal conduction to the metallic housing wall or convection.

If need be, a gaseous or liquid coolant may flow in the intermediate spaces 7 between the individual tubes 3, and between the latter and the housing wall. According to a preferred design, the coolant is water which has a sufficiently high electric conductivity, by adding a salt, for example NaCl, so that, as well as heat dissipation, it can also assume the electric coupling of the tubes 3 to the (metallic) housing. Then the external metallization of the tubes 3 can also be dispensed with; the liquid acts as external electrode.

Figure 3:
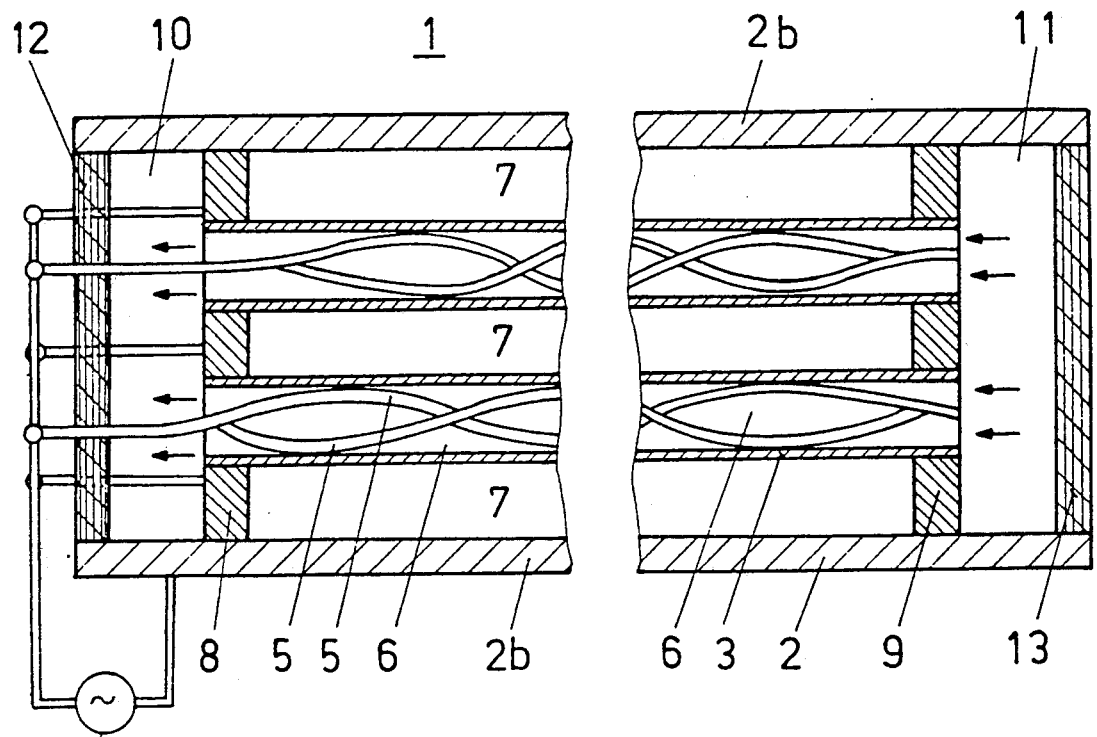
FIG. 3 shows a cross-section through the module according to FIG. 2 along its line AA.

In the sectional representation of FIG. 3, this is illustrated by way of example in the case of an ozone generator module according to FIG. 2. The packing of the tubes 3 in the housing 2 is less tight in this case, so that cooling water can also flow transversely to the longitudinal axis of the tubes. Supply and discharge of the liquid takes place either at the narrow or broad sides of the housing (not represented in FIG. 3). The supply of oxygen or the gas containing oxygen into the discharge spaces 6 takes place from the end faces of the housing. For this purpose, the upper and side housing walls (only the upper walls 2a, 2b are visible in FIG. 3) project beyond the tubes 3. The latter are embedded in metallic or plastic walls 8, 9, which separate the spaces 7 from the end spaces 10, 11 liquid-tightly. These spaces are sealed from the outside by covers 12, 13. The latter is not necessary if a plurality of modules are installed in a pressure vessel and the total gas stream is conducted through the modules by suitable measures. The end chambers 10, 11 serve as distributing chambers for the supply and discharge of the gas to be treated. The internal electrodes 5 are either led gas-tightly through the left-hand cover 12 and connected to one another outside the housing, or better still connected electrically to one another in the chamber 10, which only requires a single electrical lead-through. An alternating current source 14 is connected between the common connection of all the internal electrodes and the housing wall 2b.

Figure 4:
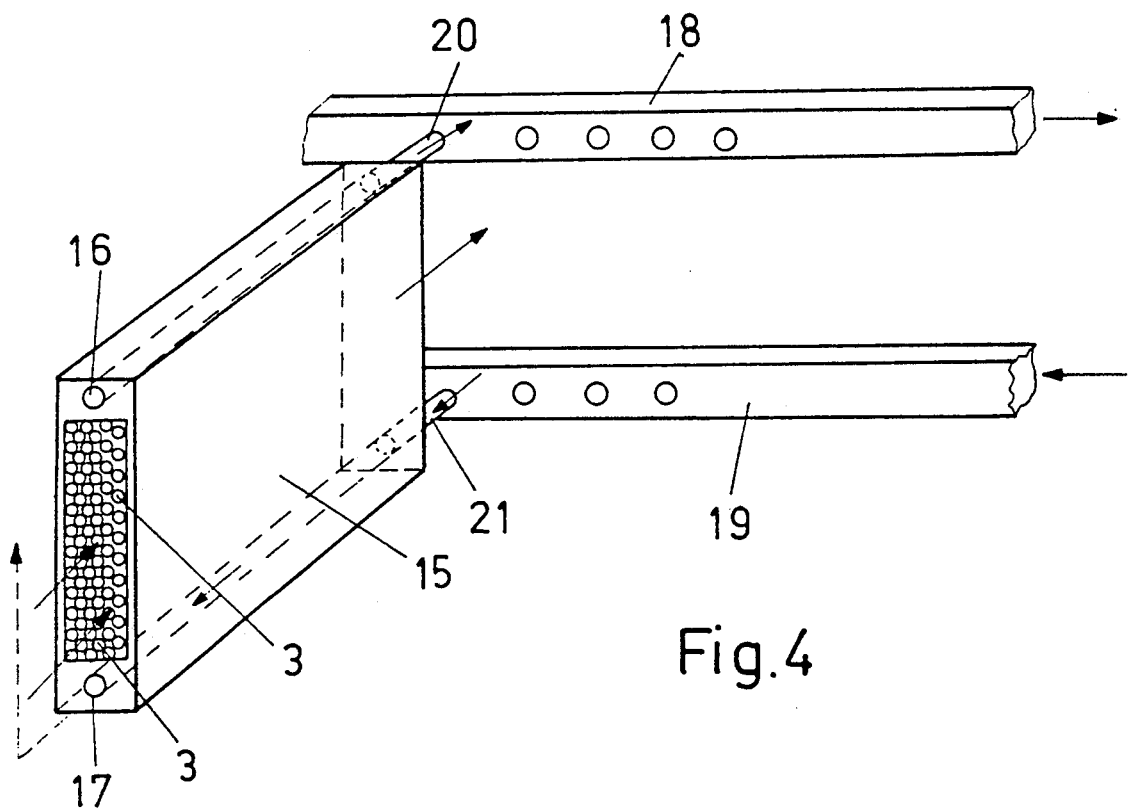
FIG. 4 shows a simplified perspective representation of an ozonizer composed of a plurality of plug-in modules.

FIG. 4 finally shows a modification of a module according to FIG. 1 and at the same time a possible way in which an ozonizer can be constructed economically from a plurality of modules. In analogy with FIG. 1, here a multiplicity of dielectric tubes 3 are accommodated, tightly packed, in an aluminum hollow section 15 and, corresponding to FIG. 1, cast with a casting compound with good thermal and electric conductivity. Cooling channels 16, 17 are provided in the solid ends of the section 15 and pass through the entire section in longitudinal direction. A cooling liquid, which is supplied and discharged via coolant collecting lines 18, 19, is conducted through these cooling channels. For this purpose, connection fittings 20, 21, by means of which the cooling channels 16, 17 can be connected to the collecting lines 18, 19 by plug or screw connections, are provided at the rear end faces of the section.

On the other end face of the profile 15, covers or shrouds (not shown) are provided, which on the one hand establish a hydraulic connection between the two cooling channels 15 and 16 and on the other hand form a collecting space for the gas to be ozonized. The electric parallel connection of all internal electrodes takes place for example at the collecting-line end in the same way as described in conjunction with FIG. 3.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A device for generating ozone from oxygen or a gas containing oxygen by silent electric discharge in a discharge space through which the oxygen or gas flows, comprising:

a plurality of tubes made of a dielectric material arranged in a cluster and disposed within a housing;

internal electrodes respectively arranged inside each of said tubes and forming a nonhomogenous discharge gap; and p1 an external electrode surrounding each of said tubes formed by at least one of metalization of external surfaces of each of said tubes and surrounding each of said tubes with an electrically conductive material;

wherein said internal electrodes pass through the entire length of each of said tubes, have a cross section substantially smaller than a cross section of said tubes, and are electrically connected to each other at least at one end of one of said tubes.

2. A device as claimed in claim 1, comprising the dielectric tubes embedded in a casting compound of a good thermal and electrical conductivity, and the electric coupling of all the tubes to a metallic housing takes place essentially via said casting compound.

3. A device as claimed in claim 2, comprising the casting compound being a metal with a low melting point or a metal powder-filled plastic.

4. A device as claimed in claim 1, comprising the tubes of dielectric material having an external metal coating and the electric coupling to a metal housing taking place via the said metallic coatings and the electric coupling among one another taking place via the coating and the current feeding taking place by means of auxiliary contacts locally contacting the coating.

5. A device as claimed in claim 1, comprising the tube clusters provided at the ends with walls wherein a coolant can be admitted to the intermediate space between the tubes and the housing or the said walls.

6. A device as claimed in claim 5, wherein the tubes have an external metal coating.

7. A device as claimed in claim 5, wherein the coolant is an electrically conductive liquid.

8. A device as claimed in one of claims 2-7 or 1, comprising the housing being designed as a hollow section with a space for receiving the tube clusters and additional cooling channels being provided in the hollow section.

9. A device as claimed in claim 8, comprising the hollow sections being provided at one end face with connection fittings for connection to coolant collecting lines.

* * * * *